United States Patent
Hannig

(10) Patent No.: US 9,849,519 B2
(45) Date of Patent: Dec. 26, 2017

(54) ULTRASONIC OSCILLATION SYSTEM AND SONOTRODE

(71) Applicant: FRAUNHOFER-GESELLSCHAFT ZUR FOERDERUNG DER ANGEWANDTEN FORSCHUNG E.V., Munich (DE)

(72) Inventor: Sophia Hannig, Aachen (DE)

(73) Assignee: Fraunhofer-Gesellschaft zur Foerderung der angewandten Forschung e.u. (DE)

( * ) Notice: Subject to any disclaimer, the term of this patent is extended or adjusted under 35 U.S.C. 154(b) by 0 days.

(21) Appl. No.: 14/392,002

(22) PCT Filed: Jun. 19, 2013

(86) PCT No.: PCT/EP2013/062816
§ 371 (c)(1),
(2) Date: Dec. 22, 2014

(87) PCT Pub. No.: WO2013/190019
PCT Pub. Date: Dec. 27, 2013

(65) Prior Publication Data
US 2015/0128772 A1 May 14, 2015

(30) Foreign Application Priority Data

Jun. 20, 2012 (DE) .......... 10 2012 105 349

(51) Int. Cl.
*B23B 29/00* (2006.01)
*B23B 29/12* (2006.01)
(Continued)

(52) U.S. Cl.
CPC .............. *B23B 29/125* (2013.01); *B06B 1/10* (2013.01); *B06B 3/00* (2013.01);
(Continued)

(58) Field of Classification Search
CPC ..... A61B 17/320068; B06B 3/00; B06B 3/02; B23B 29/12
See application file for complete search history.

(56) References Cited

U.S. PATENT DOCUMENTS 3,666,975 A * 5/1972 Balamuth ............... B26B 15/00
30/228
3,702,948 A * 11/1972 Balamuth ...... A61B 17/320068
228/1.1

(Continued)

FOREIGN PATENT DOCUMENTS

WO 2007/031180 3/2007

*Primary Examiner* — Will Fridie, Jr.
(74) *Attorney, Agent, or Firm* — David C. Purdue

(57) ABSTRACT

In an ultrasound-assisted method, in each of at least two sonotrode arms (8, 9) of a sonotrode (7) that is fixed in a protruding manner, said sonotrode arms being connected to each other by means of a respective joint (10) in each case, a respective ultrasonic wave that is transverse to the protrusion direction and that oscillates in a resonance mode is produced, wherein ultrasonic waves superposed in the at least one joint (10) and oscillating in the sonotrode arms (8, 9) of the joint (10) oscillate at a phase offset from each other, and the oscillation planes of the superposed ultrasonic waves are parallel to each other. An ultrasonic system suitable for carrying out the method comprises an ultrasound source (1), a sonotrode (7) protruding from a sonotrode retainer (6), wherein the sonotrode (7) has at least two sonotrode arms (8, 9), which are connected to each other by means of a respective joint (10) in each case and of which at least two produce different resonance modes under ultrasonic excitation, and ultrasonic waves superposed in the at least one joint (10) and oscillating in the sonotrode arms (8, 9) of the joint (10) oscillate at a phase offset from each other. The invention further relates to a corresponding sonotrode (7).

8 Claims, 3 Drawing Sheets

Figure 1:
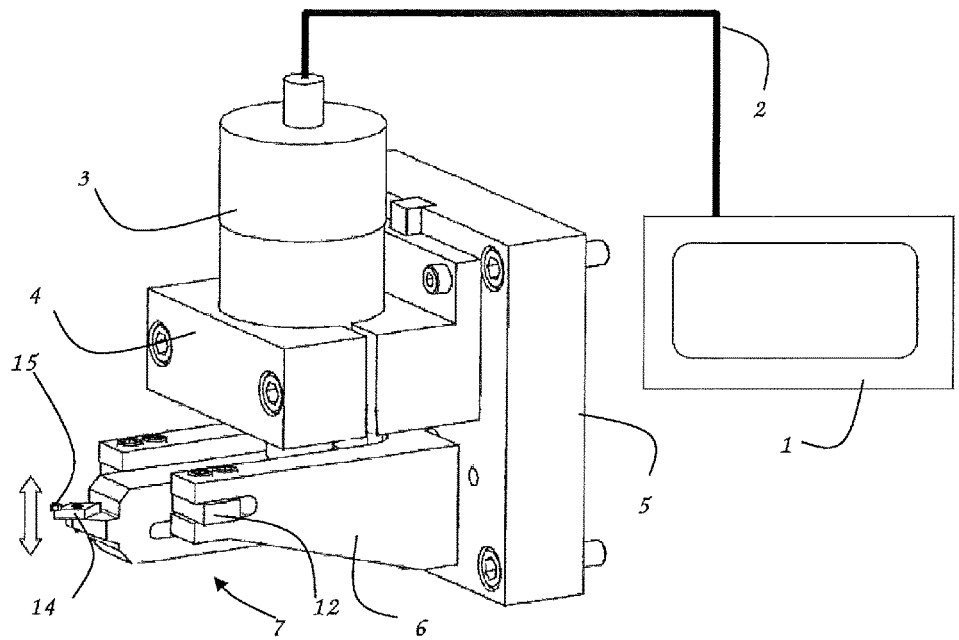

(51) Int. Cl.
*B06B 1/10* (2006.01)
*B06B 3/00* (2006.01)

(52) U.S. Cl.
CPC ......... *B23B 2260/108* (2013.01); *Y10T 82/10* (2015.01); *Y10T 82/2585* (2015.01)

(56) References Cited

U.S. PATENT DOCUMENTS

| | | | | |
|---|---|---|---|---|
| 3,934,526 | A * | 1/1976 | Damast | B26D 7/086 |
| | | | | 112/287 |
| 5,101,183 | A * | 3/1992 | Dixon | H01L 41/12 |
| | | | | 335/215 |
| 5,426,341 | A | 6/1995 | Bory et al. | |
| 5,976,314 | A * | 11/1999 | Sans | B06B 3/00 |
| | | | | 156/580.1 |
| 7,692,360 | B2 | 4/2010 | Liu et al. | |
| 7,942,063 | B2 * | 5/2011 | Gao | B23B 29/125 |
| | | | | 73/760 |
| 8,334,636 | B2 | 12/2012 | Thoms | |
| 2005/0263520 | A1 * | 12/2005 | Szucher | B26D 7/086 |
| | | | | 219/603 |

* cited by examiner

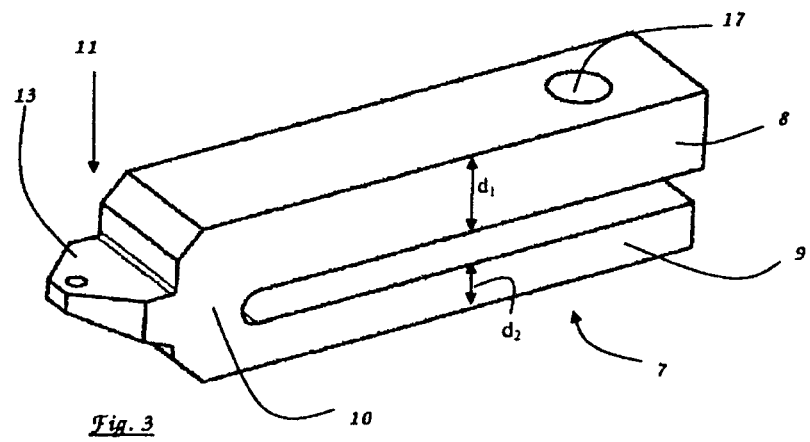
Fig. 3
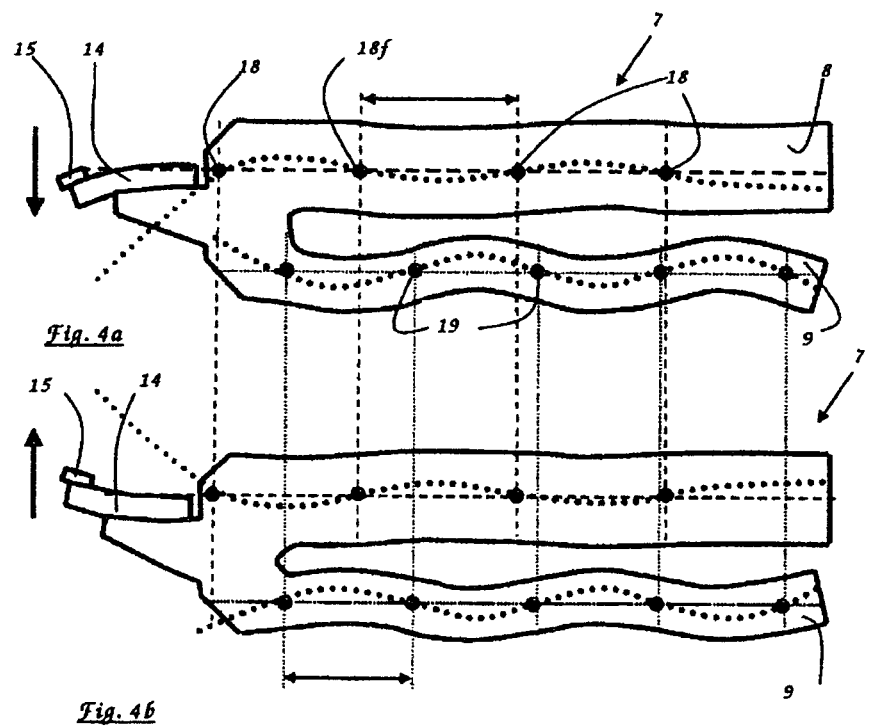
Fig. 4a
Fig. 4b

A-A

ULTRASONIC OSCILLATION SYSTEM AND SONOTRODE

The invention relates to an ultrasound-assisted method, an ultrasonic system suitable for carrying out the method, and to a sonotrode.

Ultrasound-assisted methods, in which ultrasonic oscillations are introduced into a sonotrode, which forward these sound oscillations to an active location, are known in many areas of technology. In particular, the ultrasound can thus be used in material machining, for example for assisting cutting processes. Carrying out ultra-precise machining, in particular of hardened steel, by means of a diamond tool in a manner with ultrasonic assistance is known (DE 11 2004 002 942 T5). The ultrasonic assistance counteracts a strong wear of the diamond, which is caused by the affinity of the diamond carbon to the iron in the workpiece and the diffusion processes caused thereby in the case of pressure and heat. It is no longer possible to produce ultra-precise surfaces using a tool which is subject to strong wear. If ultrasound is used to superpose an oscillation of the tool in the ultrasound frequencies of e.g. 40 to 80 kHz onto the conventional rotational kinematics, the contact time between tool and workpiece, and hence the diamond wear, is reduced and the tool service life is increased.

In the known system, the cutting tool having a cut direction parallel to the longitudinal extent of the sonotrode is arranged at the end of the sonotrode. In accordance with the cited prior art, the ultrasonic waves are coupled-in in a longitudinal resonant mode.

Turning, grinding or boring are exemplary cutting manufacturing methods which can be carried out with ultrasonic assistance. Here, the ultrasound primarily serves for reducing the process force by superposing an oscillation. Also, Separation methods, such as e.g. cutting and sawing, can be assisted by ultrasound in technology and medicine, as can methods for joining e.g. metals or plastics as well, in particular if joining has to be carried out in delicate or hard-to-reach workpiece regions.

A further large field of application is medical technology, e.g. surgical ultrasonic instruments.

However, due to the oscillation direction and the construction, the longitudinal ultrasonic system known from the aforementioned DE 11 2004 002 942 T5 is only suitable for machining of simple, cylindrical workpieces. More complex steel forms with strongly concave surfaces or free-form surfaces cannot be machined, or can only be machined with difficulties, with ultrasound assistance using longitudinal systems, since the tool often cannot reach all surface areas to be machined.

EP 0 594 541 B1 has disclosed an ultrasonic machining instrument with a ring-shaped sonotrode, which enables a short installation length in the oscillation direction of the tool, as a result of which it may be easier to machine hard-to-reach workpieces. The longitudinal oscillations generated by an oscillation exciter are taken up by the sonotrode, which forms nodes and anti-nodes along the ring. A tool and a tool-holder can be attached to one of the anti-nodes, and said tool and tool-holder then likewise vibrate with a longitudinal ultrasonic wave. What can be achieved by means of the ring-shaped sonotrode is that the tool-holder vibrates at a 90° angle in relation to the oscillation direction of the oscillation exciter. However, this cannot be used either, or can only be used with much complexity, for machining strongly concave surfaces or free-form surfaces.

If transverse ultrasonic waves are used instead of longitudinal ultrasonic waves, it is possible to achieve a cutting direction perpendicular to the longitudinal extent of the sonotrode or of the tool-holder for a tool arranged at the sonotrode end piece. This can simplify the machining of strongly concave surfaces or free-form surfaces. However, transverse ultrasonic waves in the sonotrode lead to an arctuate oscillation movement of the tool, which may be disadvantageous since the tool, after performing the cut, can again impact on the surface to be machined during the subsequent backward movement.

An ultrasonic-oscillation system is known for ultrasound-assisted turning using a monocrystalline diamond tool (Development of 3 DOF Ultrasonic Vibration Tool for Elliptical Vibration Cutting of Sculptured Surfaces; E. Shamoto et al.; CIRP Annals—Manufacturing Technology, volume 54, issue one, 2005, pages 321 to 324), in which two transverse ultrasonic oscillations, which lead to an elliptic movement of the sonotrode end piece and which are perpendicular to one another in terms of their oscillation planes, are emitted by means of piezo-elements in the sonotrode. In a development disclosed in the aforementioned prior art, another longitudinal wave can additionally be emitted such that the elliptic oscillation occurs in three-dimensional space. The elliptic path of the sonotrode end piece additionally reduces the contact time between diamond tool and workpiece surface in order to thus further restrict tool wear. Moreover, the tool is guided past the previously machined workpiece location during the return oscillation as a result of the elliptical movement thereof, as a result of which unwanted contact can be avoided. However, for practical application, the system is very cost-intensive and very complicated in relation to the actuation and the design of the piezoelectric excitation.

DE 10 2007 016 353 A1 has disclosed an ultrasonic system, in which the ultrasonic waves of a sonotrode are transmitted to an end piece holding a tool by means of an oscillation coupling unit. Here, the oscillation coupling unit comprises two vibrating beams arranged adjacent to one another, which are in each case clamped in a common input part at their one end and in a common output part at their end distant from the sonotrode. Here, the parameters of the two vibrating beams are tuned to one another in such a way that the in-phase excitation by means of sonotrode and input part leads to an in-phase movement of the ends fixed at the output part.

It is now an object of the present invention to make available an ultrasound-assisted method of the type set forth at the outset, an ultrasonic system suitable for carrying out the method, of the type set forth at the outset, and a sonotrode, which are able to increase the options for coupling ultrasonic oscillations to an active location and, in particular, are able to improve the options for machining hard-to-reach areas.

The invention discloses a novel option for superposing at least two transverse ultrasonic waves in a sonotrode. Unlike in the aforementioned prior art according to Shamoto et al., an oscillation of the sonotrode end piece which does not generate an elliptic path but rather a movement in a single oscillation plane can be obtained by the superposition of ultrasonic waves with parallel oscillation planes.

The oscillation plane denotes the plane spanned by the propagation direction of the ultrasonic wave and its oscillation direction.

In particular, it may be advantageous to select the resonant modes of the superposing ultrasonic waves in such a way for the method according to the invention that the oscillation movement of the sonotrode end piece deviates, at least in a portion of the oscillation movement, from the arctuate form which would be generated by a single transverse resonant mode, i.e. by a single bending oscillation. Rather, the oscillation movement of the sonotrode end piece can at least be approximated to a perpendicular to the projection direction of the sonotrode, given in the oscillation plane. A purely linear perpendicular upward and downward movement of the sonotrode end piece is ideal. A movement of the sonotrode end piece, and therefore of a tool attached thereto, which is as linear as possible improves the machining effect of the system. In particular, unwanted contact between tool and workpiece can be avoided during the return oscillation movement of the tool.

It was found in practice that the superposition of ultrasonic waves with oscillation planes parallel to one another enables a change in the form of the oscillation movement of the sonotrode end piece, and therefore of the tool attached thereto, in the direction of a linear movement from the arctuate form.

The oscillation of the mixed resonant mode generated in the sonotrode end piece by the superposition differs from the one of a single transverse sinusoidal ultrasonic wave in such a way that this also influences the movement trajectory of the sonotrode end piece. It is therefore possible to combine two or more transverse standing waves to form a mixed resonant mode in such a way that the movement of a tooltip arranged at the sonotrode end piece is less arctuate and at least approximates a straight form. The combinations of ultrasonic waves depending on the sonotrode geometry, suitable for this, can be established by simulation calculations.

According to the invention, the sonotrode comprises at least two sonotrode arms which can in each case oscillate independently in an inherent resonant mode. The ultrasonic waves of said sonotrode arms superpose at a joint where two sonotrode arms merge, wherein the superposed ultrasonic waves reach the sonotrode end piece.

The sonotrode end piece is preferably situated at a projecting end of the sonotrode.

There preferably is exactly one joint between in each case two sonotrode arms. More preferably, at least one of the sonotrode arms has a freely oscillating end.

In an advantageous embodiment, the joint is situated at the sonotrode end piece or in the vicinity thereof. Advantageously, the sonotrode end piece can also be identical to the joint. There can also be a plurality of joints in the case of a sonotrode with more than two sonotrode arms.

Each sonotrode arm could be excited to oscillate separately by a dedicated ultrasonic source. However, the ultrasonic oscillation is preferably only coupled into one of the sonotrode arms. The second, or each further, sonotrode arm is excited to its own resonant oscillations by means of the respective joint between the sonotrode arms. The joint causes a superposition of the resonant modes into a mixed resonant mode, which ultimately determines the oscillation of the sonotrode end piece. By way of example, the employed ultrasonic frequency may have a value in the range from 40 kHz to 80 kHz, preferably 50 kHz to 70 kHz, more preferably 55 kHz to 65 kHz.

It was found that, in the case of a suitable geometry of the sonotrode, the desired superposition of different resonant modes can be achieved at two different frequencies, which for example differ by a factor of 1.5. Therefore, one and the same sonotrode can be used for different intended purposes or at different machining parameters, e.g. for machining a first material, e.g. glass, at the first frequency and for machining a second material, e.g. steel, at the second ultrasonic frequency.

Using the invention, ultrasound with at least two resonant modes is superposed with a phase offset with respect to one another in one sonotrode, without this requiring two different ultrasonic sources or two different coupling-in locations for the ultrasound. Ultrasound coupled-in at a single location is divided by means of the sonotrode arms into plurality of ultrasonic waves with different resonant modes via the joint(s), which resonant modes then in turn superpose at the joint(s) to form a mixed resonant mode which at least co-determines the oscillation movement of a tool in the sonotrode end piece.

The frequency of the ultrasound is predetermined in the case of only one coupling-in location, while further properties of the respective ultrasonic waves are determined in the sonotrode arms, in particular the wavelength, by the material of the sonotrode arms and the geometric embodiments thereof. Therefore, the sonotrode arms can be suitably configured in terms of their length, breadth and/or thickness, and also in terms of the material thereof. It is also conceivable for different sonotrode arms of the same sonotrode to be manufactured from different materials. The sonotrode can be manufactured from one piece. Alternatively, the sonotrode arms can be attached to one another at the joint(s), for example by a joining process or mechanical aids.

Away from the joint, the sonotrode arms are preferably arranged parallel to one another. As seen in the direction of the oscillation, this arrangement can be below one another and/or next to one another.

The method according to the invention can be carried out particularly easily and effectively using a sonotrode which comprises exactly two sonotrode arms with exactly one joint. The joint is preferably arranged at the sonotrode end piece or in the vicinity thereof, or it is identical to the sonotrode end piece. Here, it may be advantageous if the ultrasonic waves formed in the two sonotrode arms oscillate substantially with the same frequency in anti-phase, i.e. substantially with a phase difference of n, at the joint.

The method according to the invention allows different configurations of the sonotrode and therefore offers high flexibility for very different applications of the sonotrode according to the invention or of the ultrasonic oscillation system according to the invention. These applications relate not only to machining steel surfaces using a diamond tool, e.g. in the optical industry. The system moreover enables direct cutting machining of glass components. In the case of workpieces made of glass, the tool wear as a result of the brittle-hard material without ultrasound would also be too high for producing e.g. optical qualities. The projecting sonotrode with the transverse machining direction, which is possible according to the invention, enables direct cutting machining of complex free-form surfaces or strongly concave surfaces in the case of glass as well, like in the case of other materials.

The method according to the invention, the sonotrode according to the invention and the ultrasonic oscillation system according to the invention can also be used in the further technological fields mentioned in the introductory part of the description when machining very different materials, e.g. when turning, grinding or boring, in the case of separation methods, joining methods, or in the case of surgical ultrasonic instruments. The form of the sonotrode suitable for the respective application and the form of the employed ultrasound can be established by simulation calculations.

The method according to the invention, the ultrasonic system according to the invention and the sonotrode according to the invention are explained below in exemplary embodiments on the basis of figures.

Figure 2:
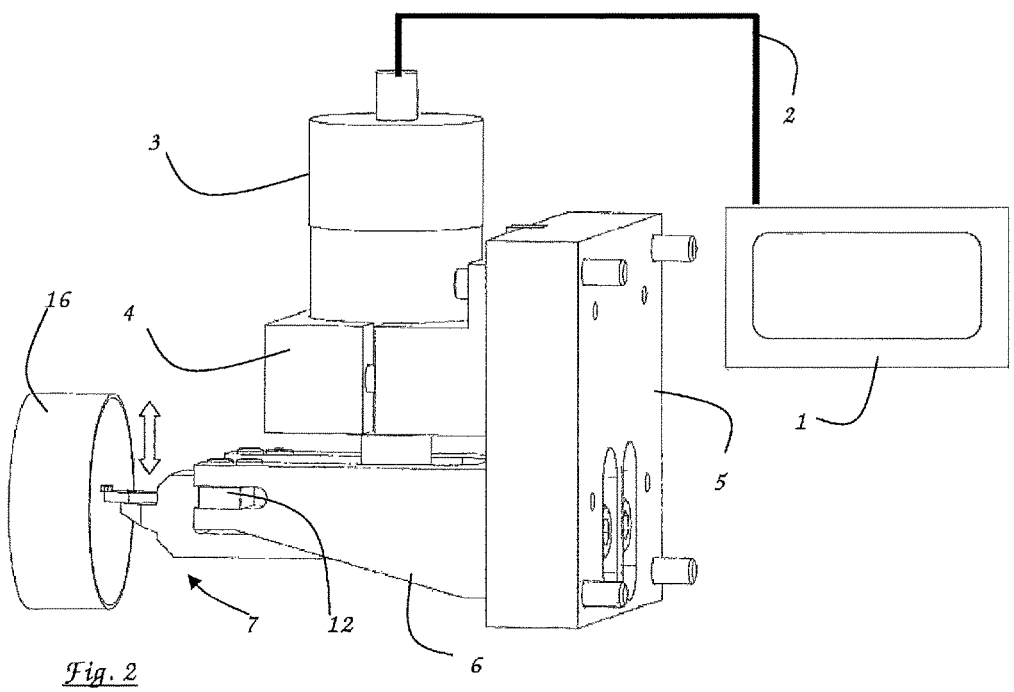
Figure 5A:
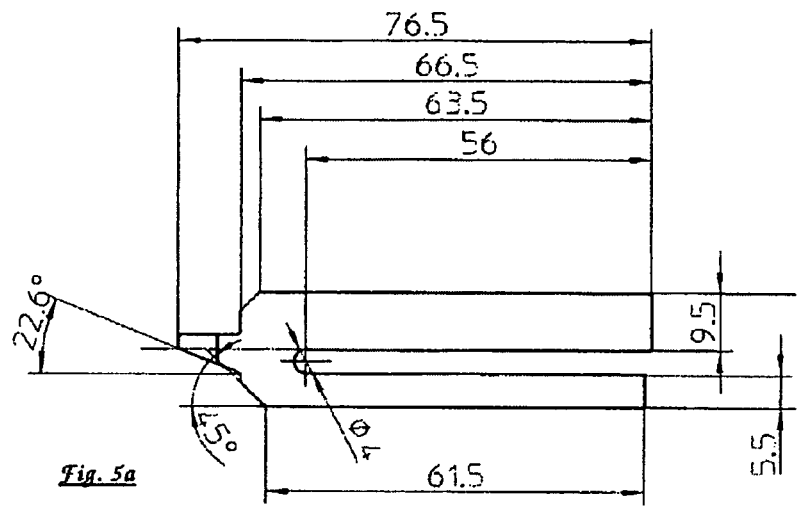
Figure 5B:
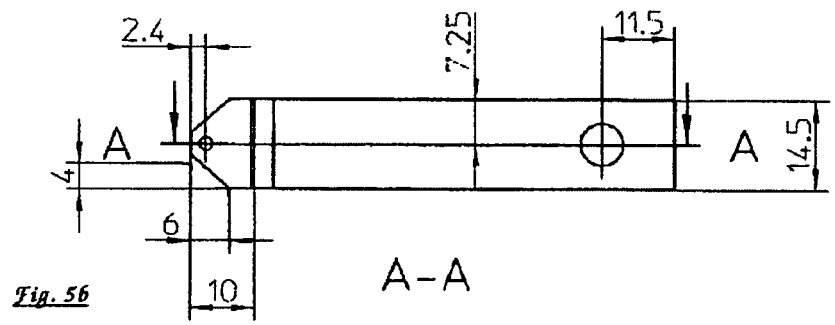
Figure 5C:
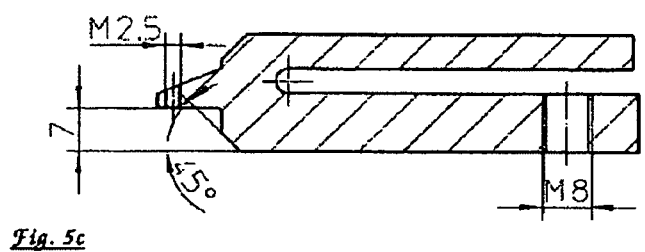

In detail:

FIG. 1 shows an ultrasonic oscillation system in a first view,

FIG. 2 shows the ultrasonic oscillation system in accordance with FIG. 1 in a second view, together with a workpiece, FIG. 3 shows a sonotrode, FIG. 4a shows the sonotrode in accordance with FIG. 3 with a tool in a first oscillation state, FIG. 4b shows the sonotrode in accordance with FIG. 4a in a second oscillation state, and FIGS. 5a-c show various views of a sonotrode with dimensional specifications.

FIG. 1 and FIG. 2 show different views of an ultrasonic oscillation system comprising a frequency generator 1, which is connected to an ultrasonic converter 3 by means of a cable 2, e.g. BNC cable. The ultrasonic converter 3 is clamped by means of a holder 4 which, in turn, is fixed to an adapter plate 5. The ultrasonic oscillation system can be attached to a machining machine by means of the adapter plate 5.

Moreover, a sonotrode holder 6, in which a sonotrode 7 is mounted, is moreover arranged at the adapter plate 5. The sonotrode 7, depicted in more detail in FIG. 3, comprises an upper first sonotrode arm 8 with a greater thickness $d_1$ and a lower second sonotrode arm 9 with a lesser thickness $d_2$ (see FIG. 3). The two sonotrode arms 8 and 9 are connected at a joint 10 in the region of the front sonotrode end piece 11.

In the sonotrode holder 6, the sonotrode 7 is held laterally in a clamping manner at its upper sonotrode arm 8 by securing elements 12 at a node 18f (FIG. 4a), which securing elements may be formed by a bolt, e.g. a threaded bolt, or cuboid elements or the like. Here, the bolt can be introduced into the sonotrode 7 by means of a bore (not depicted here). The sonotrode end piece 11 (FIG. 3) has a tool platform 13 serving for holding a tool 14 (FIG. 1). A tooltip 15 is formed by a diamond.

FIG. 2 moreover shows a workpiece 16 to be machined.

The ultrasound generated by means of the frequency generator 1 is coupled into the first sonotrode arm 8 at the coupling-in location 17 (FIG. 3) via the cable 2 and the ultrasonic converter 3. The ultrasonic wave oscillating in the direction of the double-headed arrow in FIGS. 1 and 2, and therefore transversely to the longitudinal direction of the sonotrode 7, at e.g. 60 kHz propagates through the first sonotrode arm 8 and the joint 10 to the second sonotrode arm 9. As a result of the different thicknesses of the two sonotrode arms 8 and 9, different resonant modes, i.e. standing ultrasonic waves with different wavelengths, form in the two sonotrode arms 8 and 9. At the joint 10, the two resonant modes from the upper sonotrode arm 8 and lower sonotrode arm 9 superpose to form a mixed resonant mode, with which the sonotrode end piece 11 then likewise oscillates in the direction of the double-headed arrow in FIGS. 1 and 2.

In FIG. 4a and in FIG. 4b, the sonotrode 7 is depicted schematically in two different oscillation states. The ultrasonic oscillation was coupled-in via the coupling-in location 17 depicted only in FIG. 3. It is possible to identify that the upper first sonotrode arm 8 oscillates with a lower amplitude but with longer wavelength than the lower second sonotrode arm 9 due to the greater thickness thereof. As a result of the different wavelengths, the two ultrasonic waves are phase-shifted by approximately 180° or π with respect to one another in the region of the sonotrode end piece 11, as a result of which an opposing movement of the oscillations of the two sonotrode arms 8 and 9 arises in the sonotrode end piece 11.

FIG. 4a schematically shows nodes 18 of the first sonotrode arm 8. Nodes 19 of the second sonotrode arm 9, of which only two have been provided with reference signs for reasons of clarity, are shifted in relation thereto in accordance with the shorter wavelength. The sonotrode 7 is secured to the sonotrode holder (FIG. 1) in the region of the node 18f only. In FIG. 4b, the reference signs in respect of the nodes have been dispensed with.

FIGS. 5a to 5c show an exemplary embodiment of the sonotrode 7 with dimensions, by means of which the effects desired according to the invention were obtained. The material of the sonotrode is a heat-treated steel with a specification C45E. The ratio of the ultrasonic wavelengths at a frequency of 60 kHz is 1/1.4 between the second sonotrode arm 9 and the first sonotrode arm 8.

LIST OF REFERENCE SIGNS

1 Frequency generator
2 Cable
3 Ultrasonic converter
4 Holder
5 Adapter plate
6 Sonotrode holder
7 Sonotrode
8 First sonotrode arm
9 Second sonotrode arm
10 Joint
11 Sonotrode end piece
12 Securing element
13 Tool platform
14 Tool
15 Tooltip
16 Workpiece
17 Coupling-in location
18 Node
18f Node in the region of where the sonotrode is secured
19 Node

The invention claimed is:

1. An ultrasonic system comprising
an ultrasonic source (1),
a sonotrode (7) projecting out of a sonotrode holder (6) and having an end piece, and
a machining tool (14) arranged at said sonotrode end piece (11),
wherein said sonotrode (7) comprises at least two sonotrode arms (8, 9), respectively connected to one another by means of a joint (10), said at least two sonotrode arms being operable to generate different resonant modes in the case of an ultrasonic excitation,
wherein, in said joint (10), ultrasonic waves superposed on one another and oscillating in said at least two sonotrode arms (8, 9) of the joint (10) oscillate with a phase offset in relation to one another, and
wherein said sonotrode (7) comprises a single coupling-in location (17) for the ultrasound and said joint (10) is arranged directly at said sonotrode end piece or a piece identical to said sonotrode end piece (11).

2. The ultrasonic system claimed in claim 1 wherein said coupling-in location (17) is arranged at only one of said at least two sonotrode arms (8, 9).

3. The ultrasonic system claimed in claim 1 wherein said at least two sonotrode arms (8, 9) extend parallel to one another.

4. The ultrasonic system claimed in claim 2 wherein said at least two sonotrode arms (8, 9) extend parallel to one another.

5. The ultrasonic system claimed in claim 1 wherein the ultrasonic source is operable to generate at least one ultrasonic wave which is transverse to the projection direction of the sonotrode and oscillates in a resonant mode.

6. The ultrasonic system claimed in claim 1 which is operable to produce oscillation planes of the superposed ultrasonic waves are parallel to one another.

7. The ultrasonic system claimed in claim 1 wherein the resonant modes of the superposed ultrasonic waves can be selected in such a way that, at least during a portion of the oscillation movement, the oscillation movement of said sonotrode end piece (11)
- deviates from the arcuate form of a pure bending movement generated by a single transverse ultrasonic wave, and
- is at least approximated to a perpendicular to the projection direction, given in the oscillation plane.

8. The ultrasonic system claimed in claim 2 wherein the resonant modes of the superposed ultrasonic waves can be selected in such a way that, at least during a portion of the oscillation movement, the oscillation movement of said sonotrode end piece (11)
- deviates from the arcuate form of a pure bending movement generated by a single transverse ultrasonic wave, and
- is at least approximated to a perpendicular to the projection direction, given in the oscillation plane.

* * * * *